(12) United States Patent
Duffy et al.

(10) Patent No.: US 8,201,171 B2
(45) Date of Patent: Jun. 12, 2012

(54) ADJACENT DATA PARALLEL AND STREAMING OPERATOR FUSION

(75) Inventors: John Joseph Duffy, Renton, WA (US); David Callahan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/823,427

(22) Filed: Jun. 27, 2007

(65) Prior Publication Data
US 2009/0007116 A1 Jan. 1, 2009

(51) Int. Cl.
G06F 9/46 (2006.01)
G06F 7/00 (2006.01)
G06F 9/45 (2006.01)

(52) U.S. Cl. ........ 718/101; 718/102; 707/713; 707/714; 707/715; 707/718; 717/140; 717/141; 717/148; 717/149; 717/151; 717/153

(58) Field of Classification Search .................. None
See application file for complete search history.

(56) References Cited

U.S. PATENT DOCUMENTS

| | | | |
|---|---|---|---|
| 5,548,755 A * | 8/1996 | Leung et al. | 707/999.002 |
| 6,009,265 A * | 12/1999 | Huang et al. | 707/999.003 |
| 6,112,198 A * | 8/2000 | Lohman et al. | 707/999.003 |
| 6,289,334 B1 | 9/2001 | Reiner et al. | |
| 6,345,267 B1 * | 2/2002 | Lohman et al. | 707/999.003 |
| 6,625,593 B1 | 9/2003 | Leung et al. | |
| 6,754,652 B2 | 6/2004 | Bestgen et al. | |
| 6,795,817 B2 | 9/2004 | Agarwal et al. | |
| 7,080,101 B1 | 7/2006 | Watson et al. | |
| 2005/0131880 A1 * | 6/2005 | Yoaz et al. | 707/3 |
| 2006/0080285 A1 | 4/2006 | Chowdhuri | |
| 2006/0218123 A1 | 9/2006 | Chowdhuri et al. | |

OTHER PUBLICATIONS

Chen et al., "Multiple Query Optimization in PBASE/3," High Performance Computing in the Asia-Pacific Region, 2000. Proceedings. The Fourth International Conference/Exhibition on, p. 854-858; May 2000.*
Andrade et al., "Efficient Execution of Multi-query Data Analysis Batches Using Compiler Optimization Strategies," L. Rauchwerger (Ed.): LCPC 2003, LNCS 2958, pp. 509-524, 2004.*
Tao et al., "Exploiting common subqueries for complex query optimization," Proceedings of the 2002 conference of the Centre for Advanced Studies on Collaborative research, 2002.*
Mehta et al.,"Data Engineering, 1993. Proceedings. Ninth International Conference on," p. 400-410; Apr. 1993.*
Chen, et al., "Identification- and Elimination-Based Parallel Query Processing Techniques for Object-Oriented Databases", pp. 130-148, Journal of Parallel and Distributed Computer 28, 1995.
Graefe, et al., "Dynamic Query Evaluation Plans", pp. 358-366, Copyright 1989 ACM 0-89791-317-/89/0358.
Suciu Dan, "Implementation and Analysis of a Parallel Collection Query Language", pp. 366-377, Proceedings of the 22nd VLDB Conference Mumbai, India, 1996.

* cited by examiner

*Primary Examiner* — Meng An
*Assistant Examiner* — Bing Zhao (57) ABSTRACT

Various technologies and techniques are disclosed for handling data parallel operations. Data parallel operations are composed together to create a more complex data parallel operation. A fusion plan process is performed on a particular complex operation dynamically at runtime. As part of the fusion plan process, an analysis is performed of a structure of the complex operation and input data. One particular algorithm that best preserves parallelism is chosen from multiple algorithms. The structure of the complex operation is revised based on the particular algorithm chosen. A nested complex operation can also be fused, by inlining its contents into an outer complex operation so that parallelism is preserved across nested operation boundaries.

15 Claims, 9 Drawing Sheets

ADJACENT DATA PARALLEL AND STREAMING OPERATOR FUSION

BACKGROUND

Software programs have been written to run sequentially since the beginning days of software development. Steadily over time computers have become much more powerful, with more processing power and memory to handle advanced operations. This trend has recently shifted away from ever-increasing single-processor clock rates and towards an increase in the number of processors available in a single computer, i.e. away from sequential execution and toward parallel execution. Software developers want to take advantage of improvements in computer processing power, enabling their software programs to run faster as new hardware is adopted. With parallel hardware, however, this requires a different approach: developers must arrange for one or more tasks of a particular software program to be executed in parallel (sometimes called "concurrently"), so that the same logical operation can utilize many processors at one time, and deliver better performance as more processors are added to the computers on which such software runs.

Data parallelism, where operations are expressed as aggregate computations over large collections of data, encompasses a certain class of operations using which a sequential program may be parallelized. A data parallel operation partitions its input data collection into logically disjoint subcollections so that independent tasks of execution may process the separate subcollections in isolation, all as part of one larger logical operation. Partitioning data can be a costly endeavor, because it implies inter-task communication, and similarly merging data back into a single stream can also be costly for the same reason.

SUMMARY

Various technologies and techniques are disclosed for handling data parallel operations. Individual data parallel operations are composed together to create a larger and more complex data parallel operation. A fusion plan process is performed on a particular complex operation dynamically at runtime to best achieve and preserve parallelism, eliminating superfluous partition and merge steps. As part of the fusion plan process, an analysis is performed of a structure of the complex operation and input data. One particular algorithm that best preserves parallelism is chosen from multiple algorithms. The structure of the complex operation is revised based on the particular algorithm chosen.

In one implementation, nested complex operations can also be fused. A nested complex operation can be inlined into an outer complex operation so that parallelism is preserved across nested operation boundaries, meaning that its contents are effectively copied into the outer operation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques as discussed herein may be described in the general context as an application that provides data parallel operations, but these technologies and techniques also serve other purposes in addition to these. In one implementation, one or more of the techniques described herein can be implemented as features within a framework program such as MICROSOFT®.NET Framework, or from any other type of program or service that handles data parallel operations in programs.

In one implementation, a system is provided that composes data parallel operations together to create a more complex data parallel operation. A fusion plan process is then performed on the complex operation dynamically at runtime. The term "complex operation" as used herein is meant to include any data structure which logically represents the composition of zero, one, or more operations, in which data parallel operations may appear. The term "fusion plan process" as used herein is meant to include a process that decides, through analysis, how to introduce partitioning and merging operations during the execution of such a complex operation. The term "fusion plan" as used herein is meant to include the outcome of such an analysis. The fusion plan process revises the structure of the complex operation based on a particular algorithm that is determined to best preserve parallelism. In one implementation, the number of partition and merge operations that are needed to accomplish a particular task are minimized. For example, when many data parallel operations are composed together into a complex operation, the adjacent merge/partition operators can often be merged together, to preserve the existing partitioning established at runtime. In another implementation, nested complex operations can also be fused. The term "nested complex operation" as used herein is meant to include a complex operation that is used as one of one or more of the independent operations comprising another separate complex operation.

Figure 1:
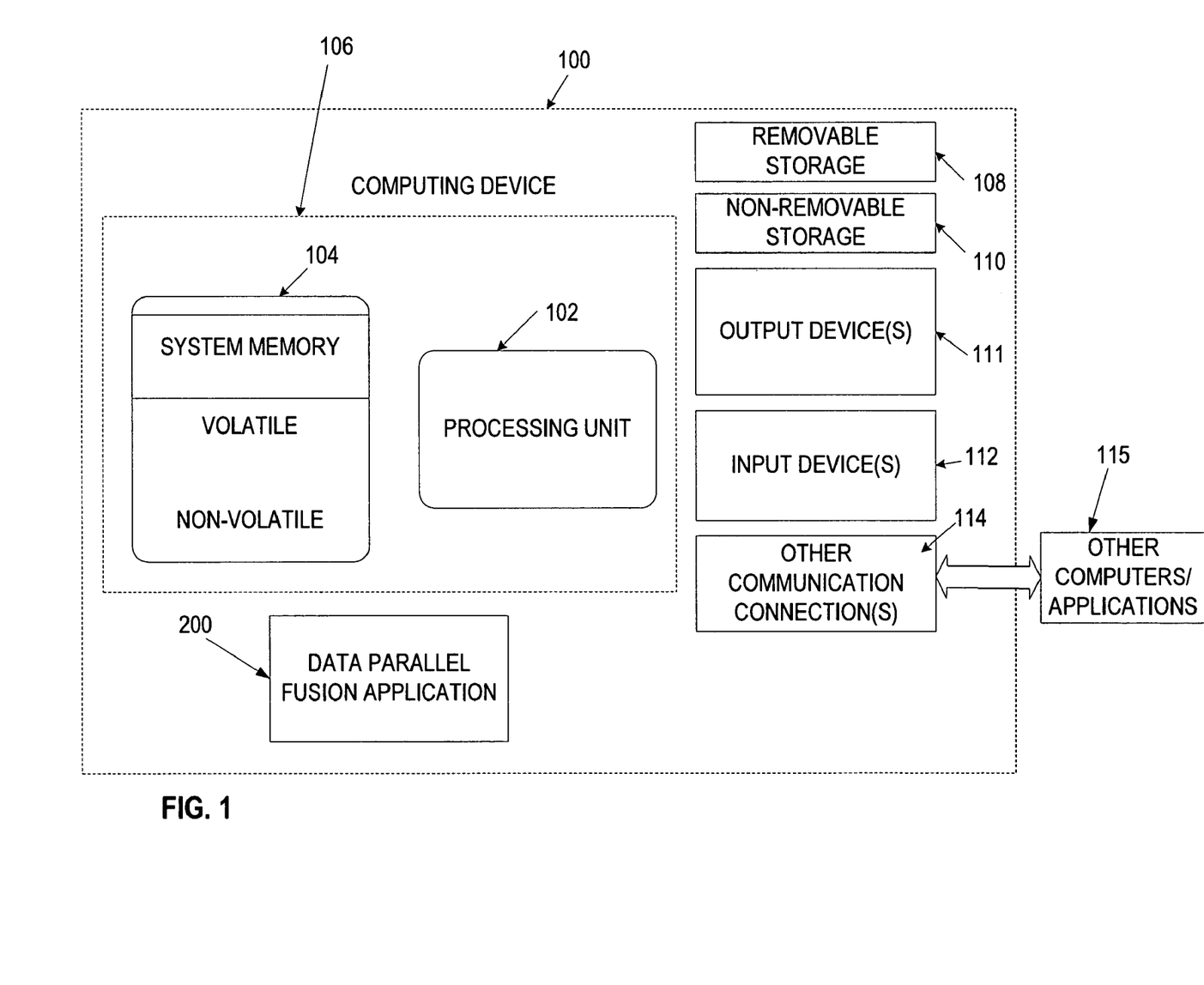
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes data parallel fusion application 200. Data parallel fusion application 200 will be described in further detail in FIG. 2.

Figure 2:
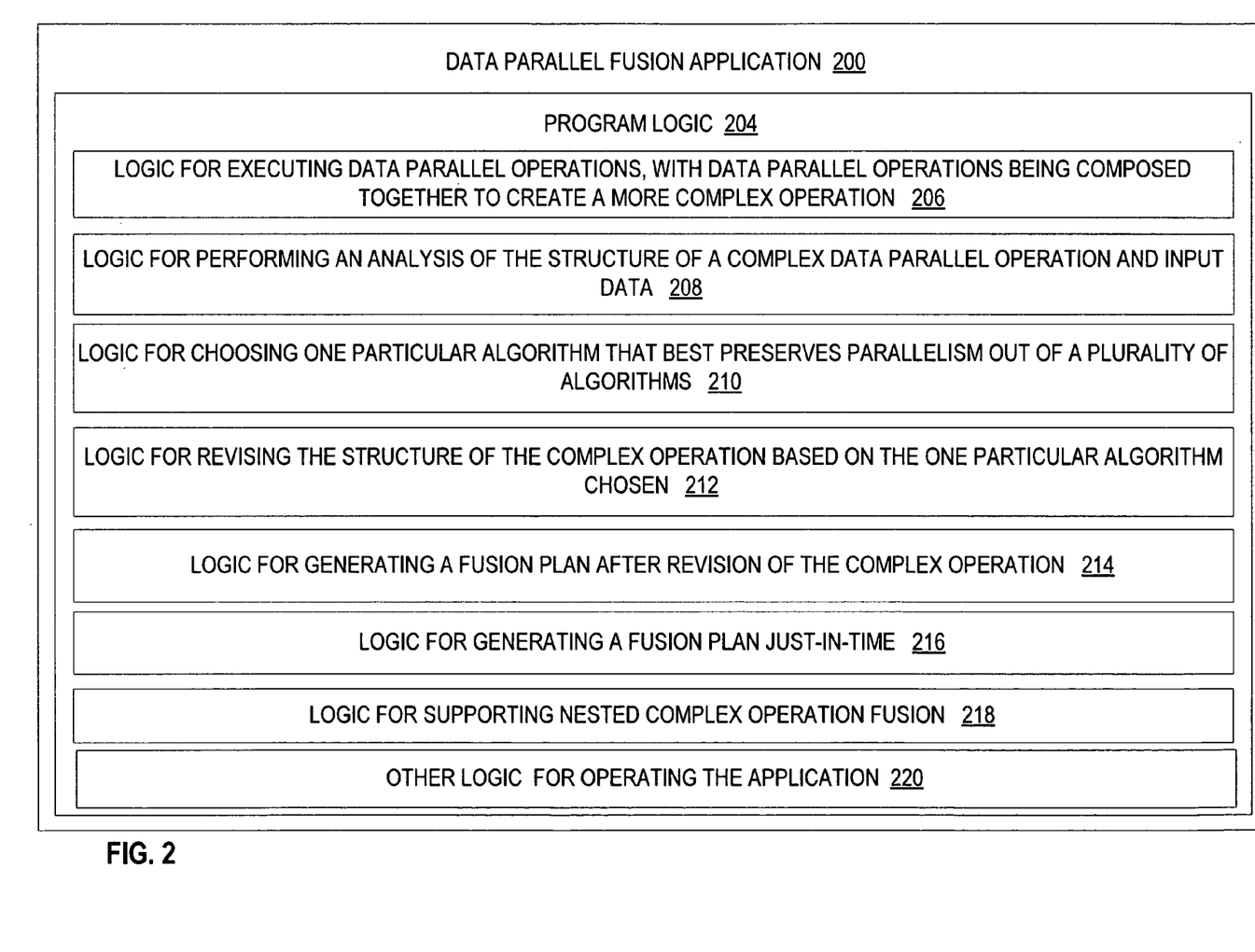
FIG. 2 is a diagrammatic view of a data parallel fusion application of one implementation operating on the computer system of FIG. 1.

Turning now to FIG. 2 with continued reference to FIG. 1, a data parallel fusion application 200 operating on computing device 100 is illustrated. Data parallel fusion application 200 is one of the application programs that reside on computing device 100. However, it will be understood that data parallel fusion application 200 can alternatively or additionally be embodied as computer-executable instructions on one or more computers and/or in different variations than shown in FIG. 1. Alternatively or additionally, one or more parts of data parallel fusion application 200 can be part of system memory 104, on other computers and/or applications 115, or other such variations as would occur to one in the computer software art.

Data parallel fusion application 200 includes program logic 204, which is responsible for carrying out some or all of the techniques described herein. Program logic 204 includes logic for executing data parallel operations, with data parallel operations being composed together to create a more complex operation 206 (as described below with respect to FIG. 3); logic for performing an analysis on the structure of a complex data parallel operation and input data 208 (as described below with respect to FIG. 3); logic for choosing one particular algorithm that best preserves parallelism out of a plurality of algorithms 210 (as described below with respect to FIG. 3); logic for revising the structure of the complex operation based on the one particular algorithm chosen 212 (as described below with respect to FIG. 4); logic for generating a fusion plan after revising the complex operation 214 (as described below with respect to FIGS. 4 and 5); logic for generating a fusion plan just-in-time 216 (as described below with respect to FIG. 5); logic for supporting nested complex operation fusion 218 (as described below with respect to FIG. 9); and other logic for operating the application 220. In one implementation, program logic 204 is operable to be called programmatically from another program, such as using a single call to a procedure in program logic 204.

Figure 3:
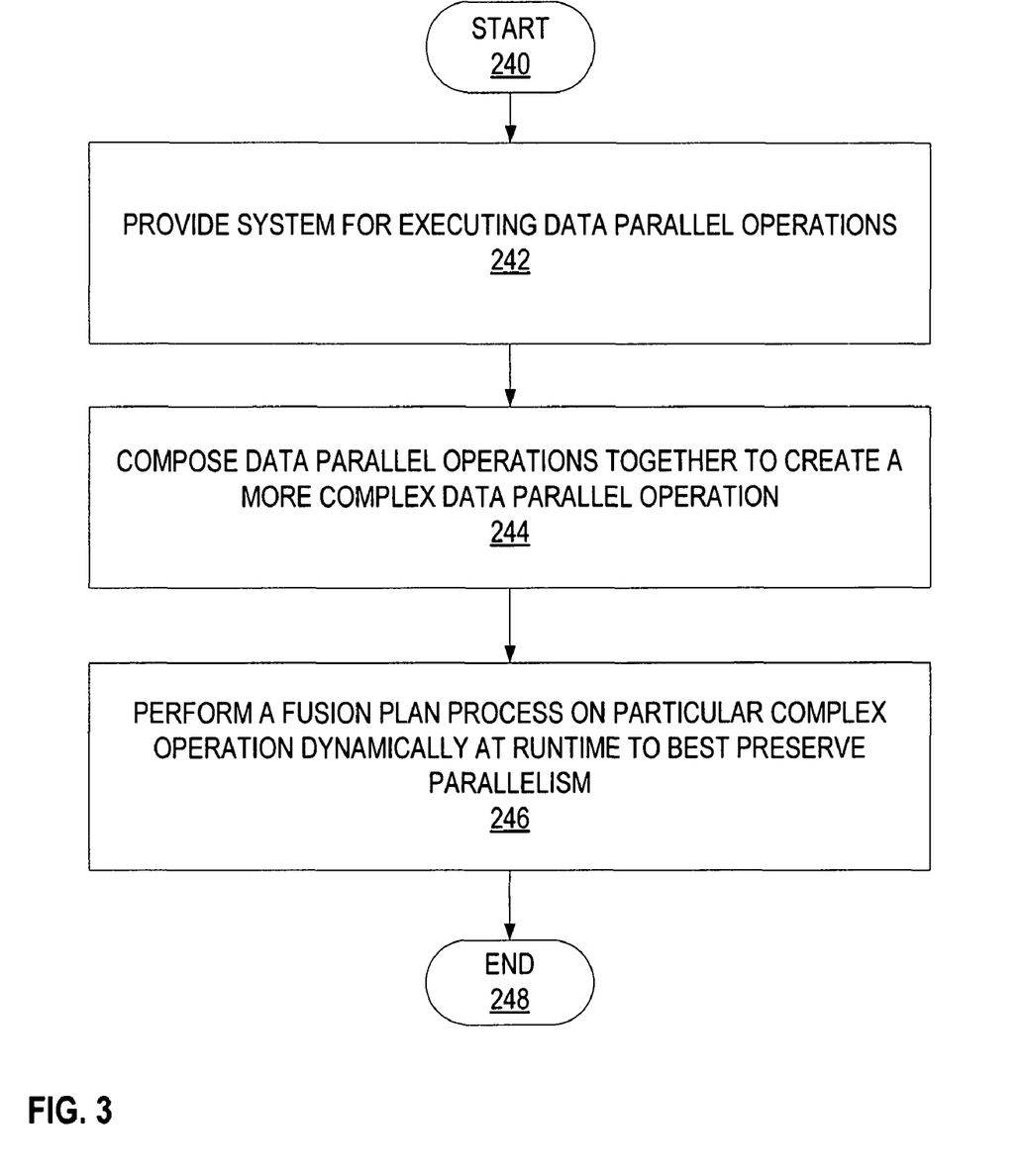
FIG. 3 is a high-level process flow diagram for one implementation of the system of FIG. 1.

Turning now to FIGS. 3-9 with continued reference to FIGS. 1-2, the stages for implementing one or more implementations of data parallel fusion application 200 are described in further detail. In some implementations, the processes of FIGS. 3-11 are at least partially implemented in the operating logic of computing device 100. FIG. 3 is a high level process flow diagram for data parallel fusion application 200. The process begins at start point 240 with providing a system for executing data parallel operations (stage 242). The system composes data parallel operations together to create a more complex data parallel operation (stage 244). The system performs a fusion plan process on a particular complex operation dynamically at runtime to best preserve parallelism (stage 246). The process ends at end point 248.

Figure 4:
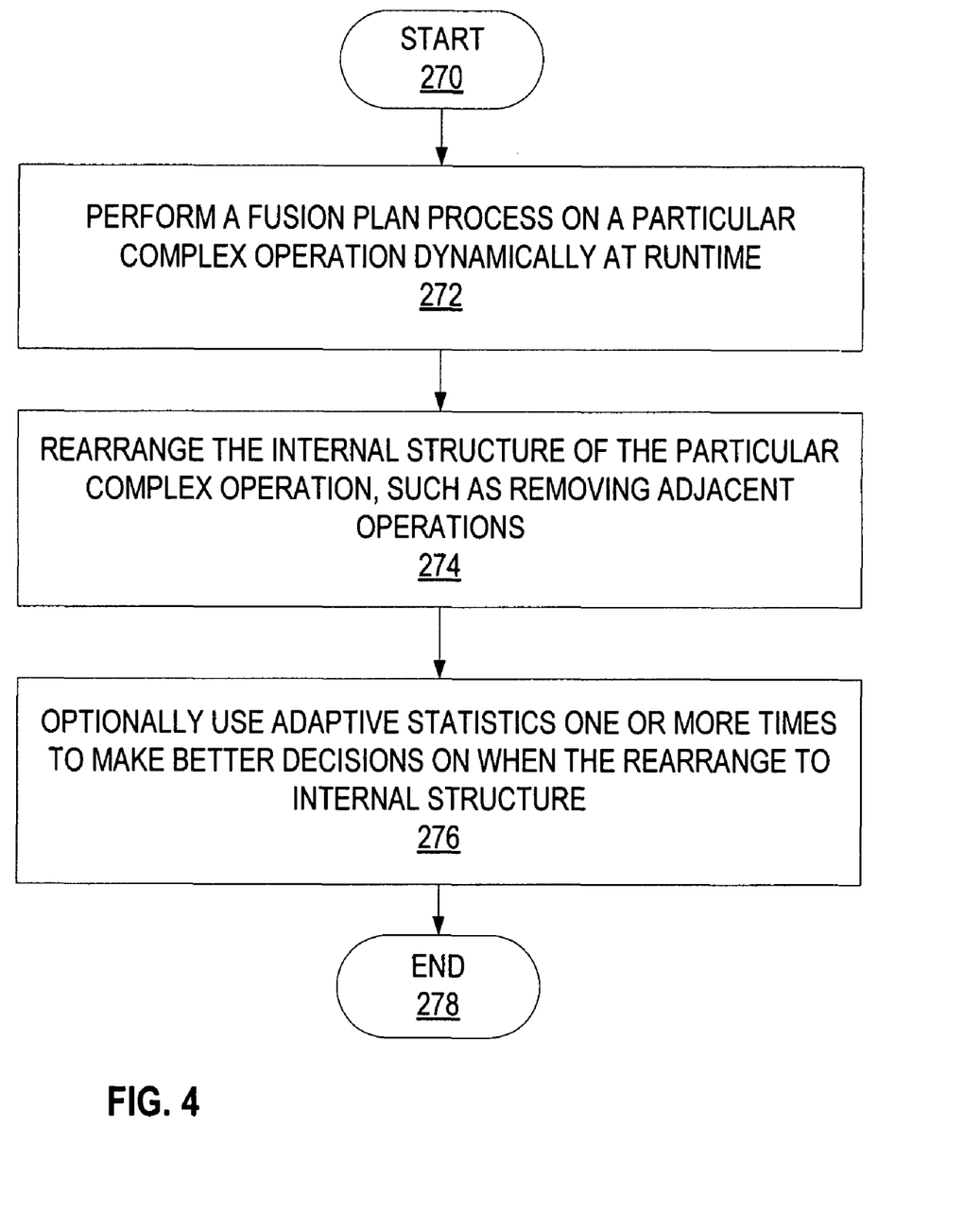
FIG. 4 is a process flow diagram for one implementation of the system of FIG. 1 illustrating the high level stages involved in a fusion plan process.

FIG. 4 illustrates one implementation of the high level stages involved in a fusion plan process. The process begins at start point 270 with performing a fusion plan process on a particular complex operation dynamically at runtime (stage 272). The system optionally rearranges the internal structure of the particular complex operation, such as removing adjacent operations (stage 274). In one implementation, the fusion plan process restructures a particular complex operation in the presence of one or more order dependent operations, grouping operations, joining operations, set operations, and/or select-distinct operations. The contents of the complex operation can be analyzed in order for the adjacent partition and merge operators to be identified and removed.

In one implementation, when an operator demands hash partitioning based on some key selection routine, or order preservation, etc., optimizations are performed to ensure that superfluous repartitioning operations are not incurred (e.g. taking the form of a merge/partition pair, which can be implemented more efficiently). These decisions are made during analysis of the complex operation. For example, if a join operator demands hash partitioning on some key, the system "flows" this requirement down the tree of complex operations to the leaves, which is where partitioning normally happens. Only if there is another operator that requires a conflicting partitioning technique between the join operator and the leaves does repartitioning need to be used. Otherwise, the one required partitioning technique is guaranteed to be used once, eliminating superfluous and costly synchronization due to repartitioning.

Adaptive statistics are optionally used one or more times to make better decisions on when the rearrange to internal structure (stage 276). The process ends at end point 278.

Figure 5:
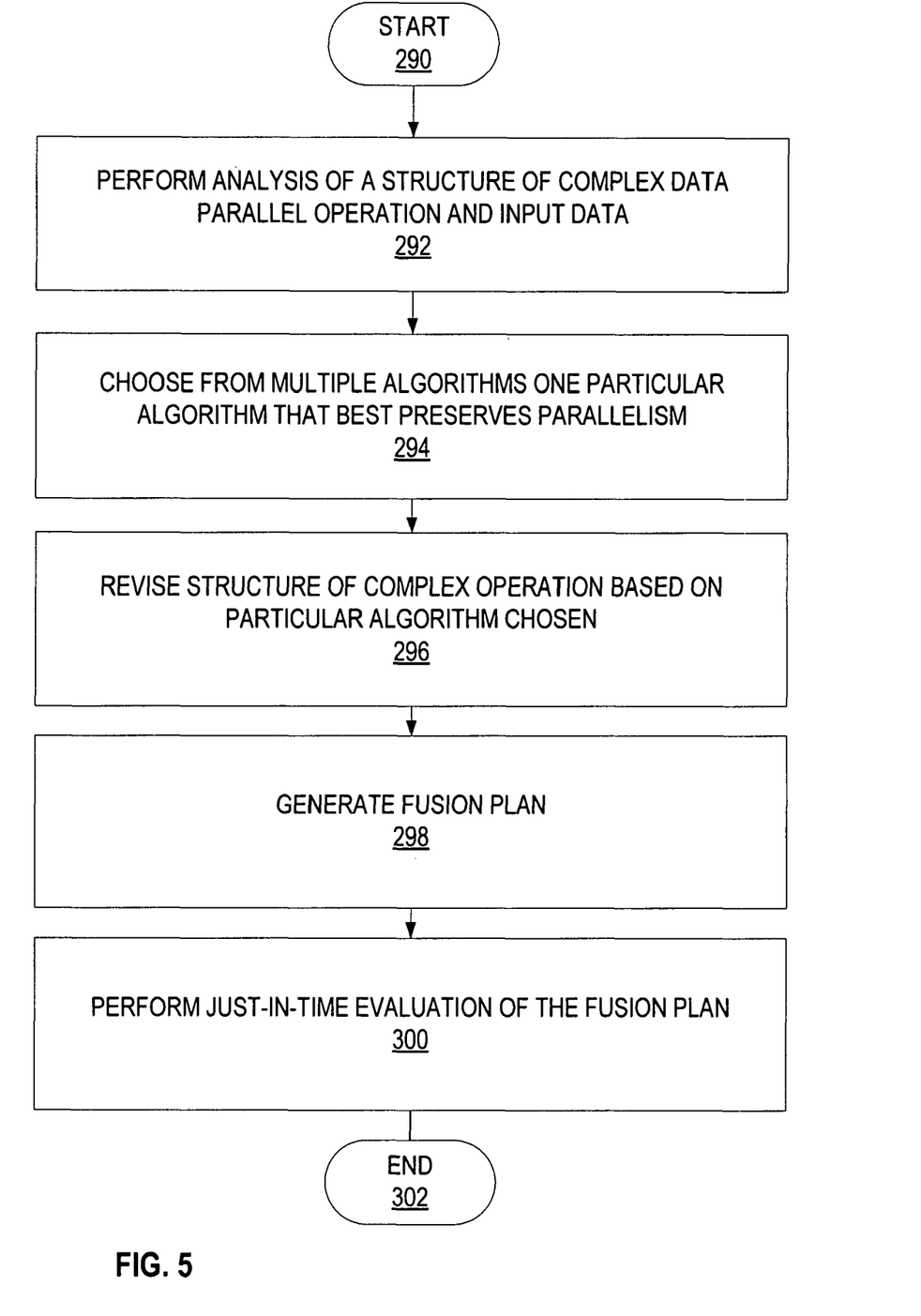
FIG. 5 is a process flow diagram for one implementation of the system of FIG. 1 illustrating the more detailed stages involved in performing a fusion plan process.

FIG. 5 illustrates one implementation of the more detailed stages involved in performing a fusion plan process. The process begins at start point 290 with the system performing analysis of a structure of complex data parallel operation and input data (stage 292). One particular algorithm is chosen out of multiple algorithms that best preserves parallelism (stage 294). The structure of complex operation is revised based on particular algorithm chosen (stage 296).

Let's look at a few examples to further illustrate how this restructuring works. As a first non-limiting example, suppose you have two individual data parallel operators a and b, which are adjacent to one another, forming a complex operation—that is, b consumes the output of operator a (a situation that is quite common in streaming, vector, and data parallel query processing). The adjacent merge/partition pairs can be fused so that only a single partition (and optionally, a single merge) step is required, i.e. partition→a→b→merge, instead of the unoptimized sequence of operations, partition→a→merge→partition→b→merge. This technique can extend beyond this example which just had two operations in a complex operation.

Let's now look at a more complex example to further illustrate the concept of performing a fusion plan process to restructure a complex data parallel operation. Suppose you have the following data parallel operation:

```
var q=from x in A
    join with y in B on y.Data equals x*10
    where (x % 2)=0
    orderby x
    groupby new {x, y.Data} by x;
```

The system can parallelize this by simply omitting the adjacent merge/partition pairs. Notice that this can occur even though the Join operator requires hash partitioning on the two input collections A and B:

```
HashPartition(A,
    B)→Join→Where→OrderBy→GroupBy→Merge
```

The system then generates a fusion plan (stage 298) and performs just-in-time evaluation of the fusion plan (stage 300). The term "just-in-time evaluation" as used herein is meant to include the ability to perform planning on an as-needed, reactive basis, rather than needing to perform this up front, e.g. during compilation. The process ends at end point 302.

Figure 6:
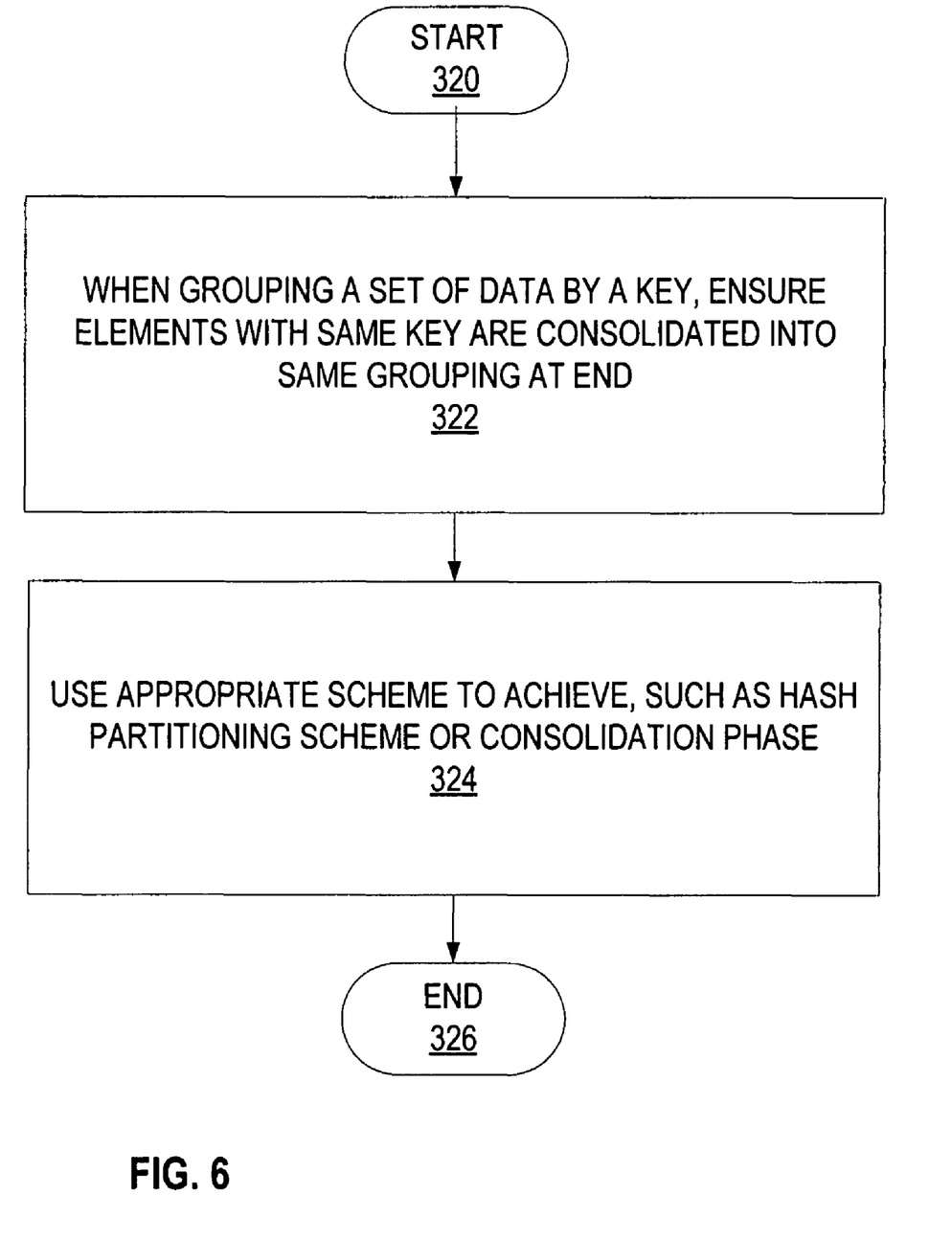
FIG. 6 is a process flow diagram for one implementation of the system of FIG. 1 illustrating the stages involved in performing fusion on grouping operators.

FIG. 6 illustrates one implementation of the stages involved in performing fusion on grouping operators, in which elements of a collection are grouped together by some common key. The process begins at start point 320 with ensuring elements with the same key are consolidated into the same group at the end when grouping a set of data by a key (stage 322). The system uses appropriate scheme to achieve, such as hash partitioning scheme or consolidation phase (stage 324). The hash partitioning scheme can ensure that elements with equal keys are placed into the same partition, avoiding inter-task communication. Alternatively, the consolidation scheme can be performed during the merging of a data parallel operation's results to consolidate the same keys into the same group. The process ends at end point 326.

Figure 7:
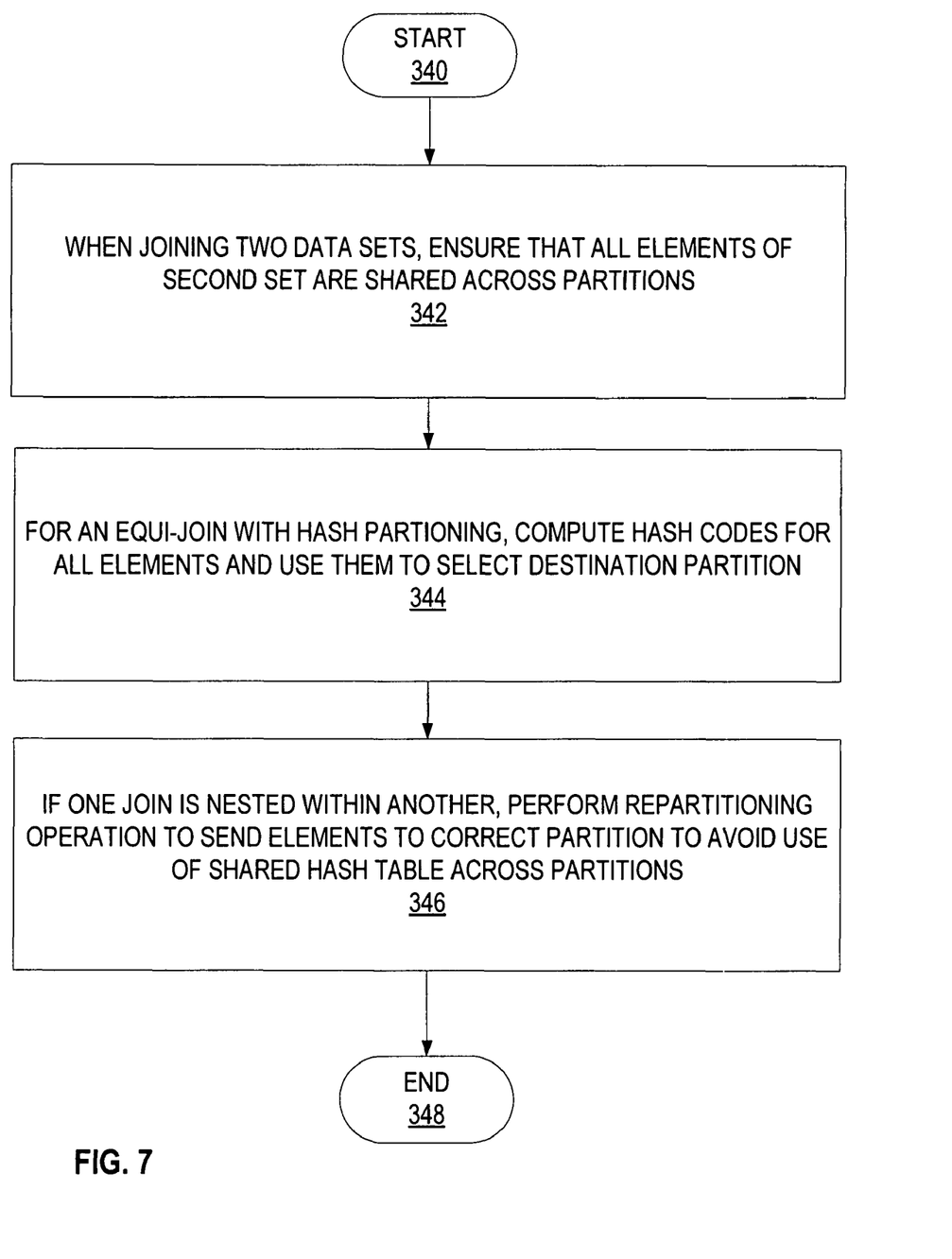
FIG. 7 is a process flow diagram for one implementation of the system of FIG. 1 that illustrates the stages involved in performing fusion on joining operations.

FIG. 7 illustrates one implementation of the stages involved in performing fusion on joining operations. The process begins at start point 340 with ensuring that all elements of second set are shared across partitions when joining two data sets (stage 342). For an equi-join with hash partioning, hash codes are computed for all elements and used to select the destination partition (stage 344). If one join is nested within another, a repartitioning operation is performed to send elements to the correct partition to avoid the use of a shared hash table across partitions (stage 346). The process ends at end point 348.

Figure 8:
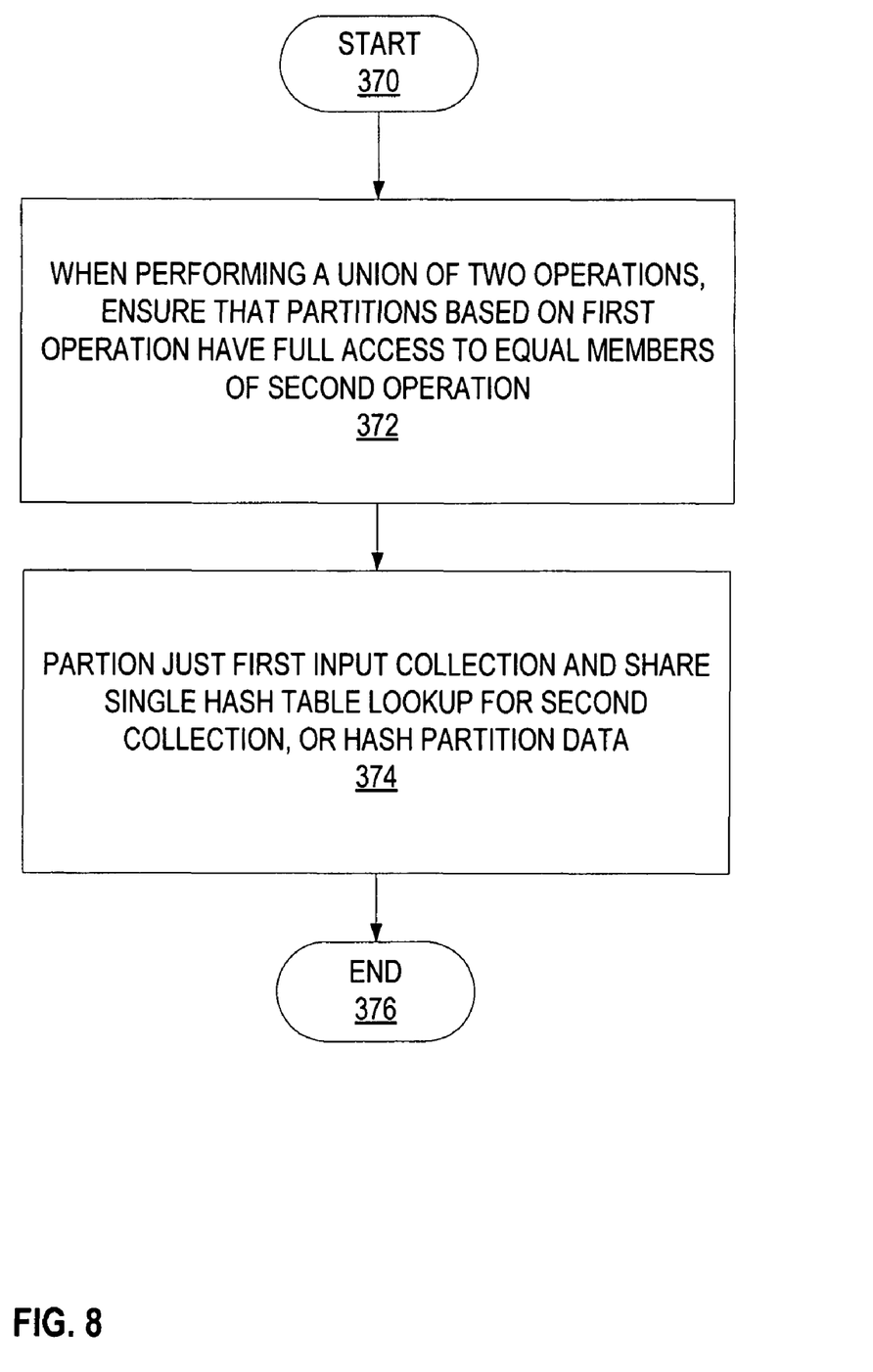
FIG. 8 is a process flow diagram for one implementation of the system of FIG. 1 that illustrates the stages involved in performing fusion on set operations.

FIG. 8 illustrates one implementation of the stages involved in performing fusion on set operations, e.g. union, intersection, difference, etc. The process begins at start point 370 with ensuring that partitions based on first operation have full access to equal members of the second operation when performing a union of two operations (stage 372). Just the first input collection is partitioned and a single hash table lookup is shared for the second collection, or the data is hash partitioned to ensure equivalent elements from both collections are assigned to the same partition (stage 374). The process ends at end point 376.

In one implementation, fusion can be performed on order dependent operations, such as zipping, concatenation, reversing, sorting, and general ordinal element order preservation, to name a few non-limiting examples. "Zipping" means producing a single stream of pairwise elements out of two independent data sources. "Order dependent operations" are operations that place demands on the system to ensure that some relative ordering among elements is established and preserved throughout execution, ensuring the final merged output respects the ordering. For example, if a sort operation appears in the middle of a complex operation, it can be beneficial for subsequent operations to run in parallel and enjoy the benefits of the fusion planning process. The system thus supports preserving the partitioned parallelism across such order dependent operations by tracking logical ordering information during execution, and deferring actual physical establishment of said order until the merge process.

Figure 9:
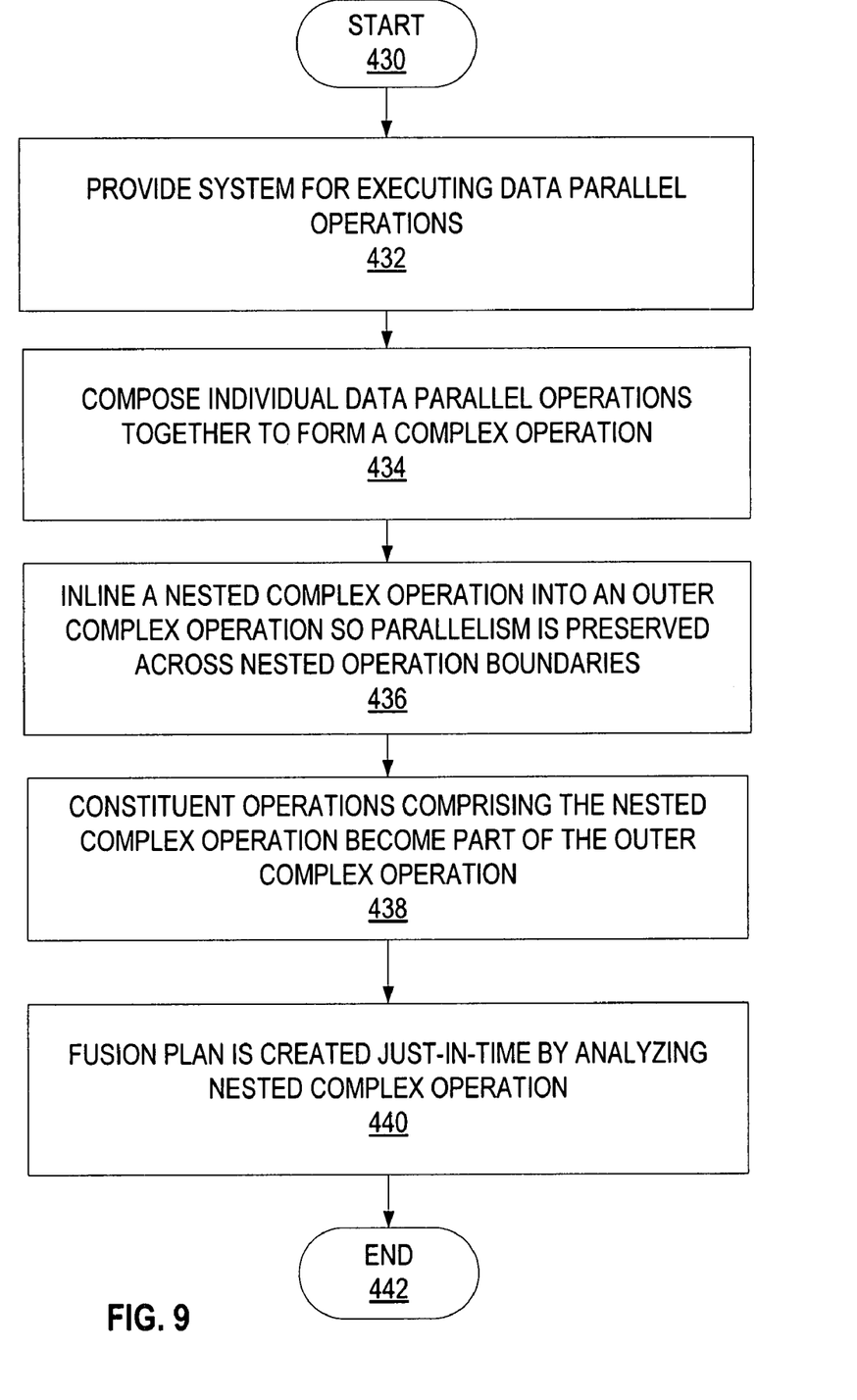
FIG. 9 is a process flow diagram for one implementation of the system of FIG. 1 that illustrates the stages involved in fusing nested complex operations.

FIG. 9 illustrates one implementation of the stages involved in fusing nested complex operations. The process begins at start point 430 with providing a system for executing data parallel operations (stage 432). The system composes individual data parallel operations together to form complex operations (stage 434). A nested complex operation is inlined into an outer complex operation so parallelism is preserved across nested operation boundaries (stage 436), which effectively means that the constituent operations comprising the nested complex operation become part of the outer complex operation (stage 438).

Let's look at an example nested data parallel operation to further illustrate this concept. Suppose you have the following set of operations:

```
var q0=from x in A
    where (x % 2)=0
    orderby x
    select x;
var q1 =from y in q0
    join with z in B on z.Data equals y*10
    groupby new {y, z.Data} by y;
The system fuses 'q0' "into" 'q1' when the two are com-
    posed together, effectively leading to the following
    operation:
var q1=from y in
    (from x in A
        where (x % 2)=0
        orderby x
        select x)
    join with z in B on z.Data equals y*10
    groupby new {y, z.Data} by y;
```

In one implementation, this process eliminates unnecessary partitioning and merging, which is driven by the fusion planning process (stage 440). The process ends at end point 442.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:
1. A method for fusing data parallel operations comprising the steps of:

creating a complex data parallel operation comprising a plurality of individual data parallel operations, wherein each data parallel operation contains one or more data parallel operators; and performing a fusion plan process on the complex data parallel operation and input data to the complex data parallel operation dynamically at runtime of execution of the complex data parallel operation, the fusion plan process including analyzing an internal structure of the complex data parallel operation including identifying one or more pairs of a partition operator and a corresponding merge operator of the complex data parallel operation that are adjacent to one another, the partition operator partitions the input data and the merge operator merges results of a data parallel operator of the partitioned input data and removing a pair of the identified adjacent partition and merge operators determined to be unnecessary, due to a reusable nature of an existing partitioning, at runtime, wherein the fusion plan process rearranges the internal structure of the complex data parallel operation, and, optimizations are performed to ensure that repartitioning operations including unnecessary partition operators and merge operators are not incurred when rearranging the complex data parallel operation.

2. The method of claim 1, wherein adaptive statistics are used to make decisions on when to rearrange the internal structure of the complex data parallel operation.

3. The method of claim 1, wherein the fusion plan process restructures the complex data parallel operation, the complex data parallel operation comprising one or more order dependent operations.

4. The method of claim 3, wherein the order dependent operations are selected from the group consisting of zipping, concatenation, reversing, and sorting.

5. The method of claim 1, wherein the fusion plan process further restructures the complex data parallel operation in the presence of one or more grouping operations in the particular complex data parallel operation.

6. The method of claim 1, wherein the fusion plan process further restructures the complex data parallel operation in the presence of one or more joining operations in the particular complex data parallel operation.

7. The method of claim 1, wherein the fusion plan process further restructures the complex data parallel operation in the presence of one or more set operations in the particular complex data parallel operation.

8. The method of claim 1, wherein the fusion plan process further restructures the complex data parallel operation in the presence of one or more select-distinct operations in the particular complex data parallel operation.

9. The method of claim 1, wherein a fusion plan is generated as a result of the fusion plan process.

10. The method of claim 1, wherein a fusion plan is generated just-in-time from the fusion plan process.

11. A computer storage medium having computer-executable instructions for causing a computer to perform the steps recited in claim 1.

12. A computer storage medium having computer-executable instructions for causing a computer to perform steps comprising:

creating a complex data parallel operation comprising a plurality of individual data parallel operations, wherein each data parallel operation contains one or more data parallel operators; and performing a fusion plan process on the complex data parallel operation and input data to the complex data parallel operation dynamically at runtime of execution of the complex data parallel operation, the fusion plan process including analyzing an internal structure of the complex data parallel operation including identifying one or more pairs of a partition operator and a corresponding merge operator of the complex data parallel operation that are adjacent to one another, the partition operator partitions the input data and the merge operator merges results of a data parallel operator of the partitioned input data and removing a pair of the identified adjacent partition and merge operators determined to be unnecessary due to a reusable nature of an existing partition, at runtime, wherein the fusion plan process rearranges the internal structure of the complex data parallel operation, and, wherein the fusion plan process restructures the complex data parallel operation, the complex data parallel operation comprising one or more order dependent operations.

13. The computer storage medium of claim 12, further having computer-executable instructions for causing a computer to perform steps comprising:

generating a fusion plan as a result of the fusion plan process.

14. The computer storage medium of claim 13, wherein a just-in-time generation of the fusion plan is performed.

15. The method of claim 1, wherein identifying adjacent partition and merge operators of the complex data parallel operation and removing the identified adjacent partition and merge operators while preserving an existing partitioning at runtime is based on an operator of the complex data parallel operation demanding hash partitioning on a particular key.

* * * * *